United States Patent
Liu et al.

(10) Patent No.: US 9,785,487 B1
(45) Date of Patent: Oct. 10, 2017

(54) MANAGING DEVICE FUNCTIONS BASED ON PHYSICAL INTERACTION WITH DEVICE MODULES

(71) Applicant: GOOGLE INC., Mountain View, CA (US)

(72) Inventors: Eric Liu, Redwood City, CA (US); Yoshimichi Matsuoka, Sunnyvale, CA (US); Jason Chua, San Francisco, CA (US); Kevin D. Brune, Maple Valley, WA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/709,982

(22) Filed: May 12, 2015

(51) Int. Cl.
- *G06F 9/54* (2006.01)
- *G06F 9/445* (2006.01)
- *G06F 1/16* (2006.01)

(52) U.S. Cl.
CPC ............ *G06F 9/542* (2013.01); *G06F 1/1633* (2013.01); *G06F 9/445* (2013.01)

(58) Field of Classification Search
None
See application file for complete search history.

(56) References Cited

U.S. PATENT DOCUMENTS

| | | |
|---|---|---|
| 6,480,724 B1 | 11/2002 | Erkkila et al. |
| 7,515,709 B2 | 4/2009 | Richter |
| 7,618,260 B2 | 11/2009 | Daniel et al. |
| 8,050,715 B1 | 11/2011 | Cole |
| 8,086,269 B2 | 12/2011 | Wang |
| 8,380,252 B2 | 2/2013 | Ijas et al. |
| 8,483,758 B2 | 7/2013 | Huang |
| 2002/0102946 A1 | 8/2002 | SanGiovanni |
| 2002/0155864 A1 | 10/2002 | Wang |
| 2007/0094487 A1* | 4/2007 | Lee ........................ G06F 9/3861 713/1 |
| 2009/0154933 A1* | 6/2009 | Mortensen ............. G08C 23/04 398/107 |
| 2011/0050447 A1* | 3/2011 | Tedesco ............. G08B 13/1427 340/687 |
| 2011/0055408 A1* | 3/2011 | Baker ................... H04L 67/327 709/228 |

(Continued)

OTHER PUBLICATIONS pocket-lint.com, "Fonkraft: Modular smartphone with 4,100mAh battery, 20MP camera, 192kHz audio and more is here," (Apr. 28, 2015). Retrieved from the Internet on Jun. 2, 2015: http://www.pocket-lint.com/news/133703-fonkraft-modular-smartphone-with-4-100mah-battery-20mp-camera-192khz-audio-and-more-is-here.

(Continued)

*Primary Examiner* — Tuan Dao
(74) *Attorney, Agent, or Firm* — Marshall, Gerstein & Borun LLP

(57) ABSTRACT

Embodiments are provided for managing operation of an electronic device based on the connection(s) of hardware module(s) to the electronic drive via a support housing. According to certain aspects, the electronic device may detect when a hardware module connects to the support housing. The electronic device may identify a function associated with the hardware module, where the function may be a built-in function of the hardware module itself or of the electronic device. The electronic device may accordingly activate the identified function.

16 Claims, 7 Drawing Sheets

(56) References Cited

U.S. PATENT DOCUMENTS

| | | | |
|---|---|---|---|
| 2011/0320573 A1* | 12/2011 | Flemming | G06F 9/541 709/220 |
| 2013/0067154 A1* | 3/2013 | Deng | G06F 3/0605 711/103 |
| 2013/0227591 A1 | 8/2013 | Wang et al. | |
| 2013/0232280 A1* | 9/2013 | Perek | G06F 1/1618 710/14 |
| 2014/0288822 A1* | 9/2014 | Morrison | G01S 19/23 701/466 |
| 2015/0036047 A1* | 2/2015 | Bledsoe | H04N 5/2254 348/375 |
| 2015/0067196 A1* | 3/2015 | Little | G06F 9/44584 710/14 |
| 2015/0350014 A1* | 12/2015 | McKeever | G06F 13/4022 370/254 |

OTHER PUBLICATIONS phonebloks.com, "Phonebloks a Phone Worth Keeping," (2015). Retrieved from the Internet on Jun. 2, 2015: http://phonebloks.com/en.

cnet.com, "Samsung Upstage review," (Mar. 25, 2007). Retrieved from the Internet on Jun. 2, 2015: http://www.cnet.com/products/samsung-upstage/.

Google Inc., "Project Ara Module Developers Kit (MDK)," (2014). Retrieved from the Internet at: URL:http://www.industrie.com/it/mediathegue/3/1/6/000012613.pdf.

International Search Report and Written Opinion for Application No. PCT/US2016/031967, dated Jul. 27, 2016.

\* cited by examiner

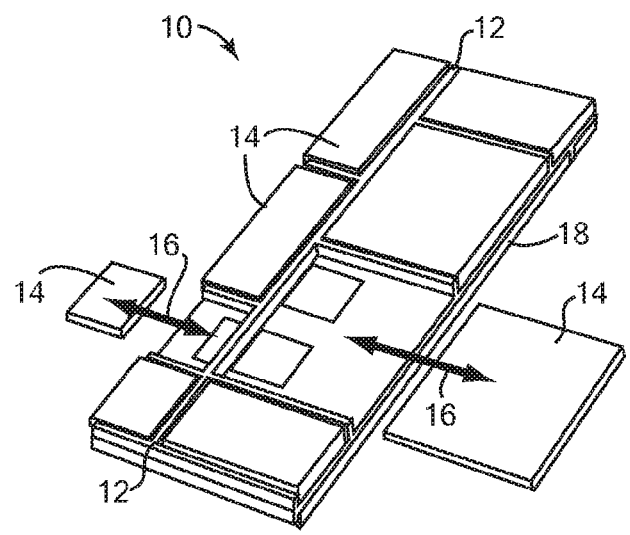
FIG. 1
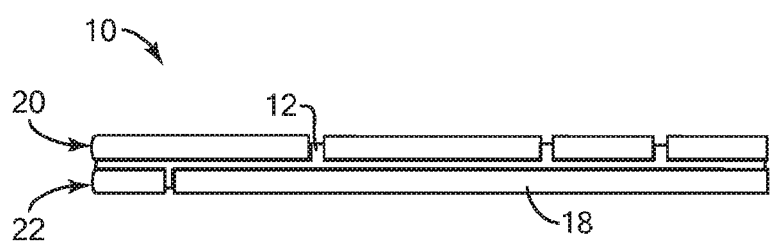
FIG. 2
FIG. 3
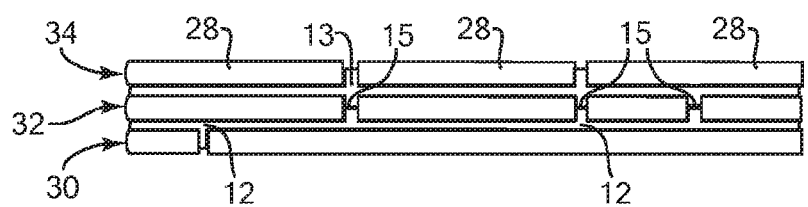
FIG. 4

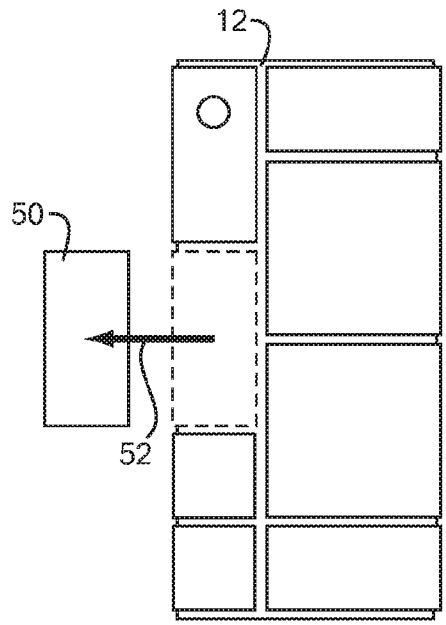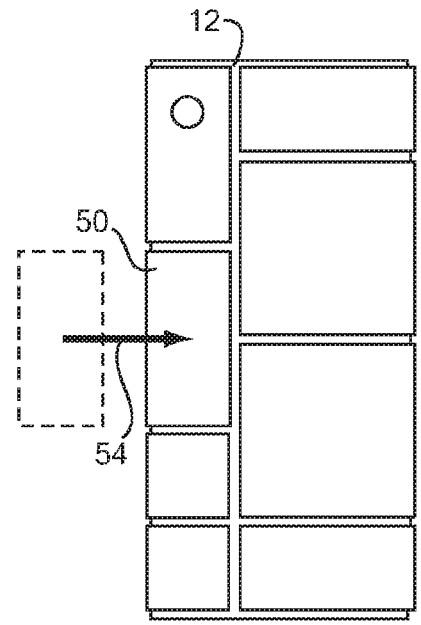
FIG. 6A                FIG. 6B
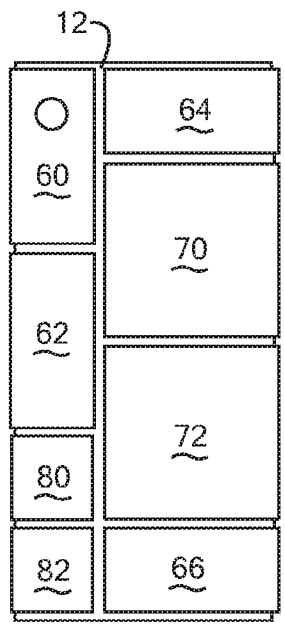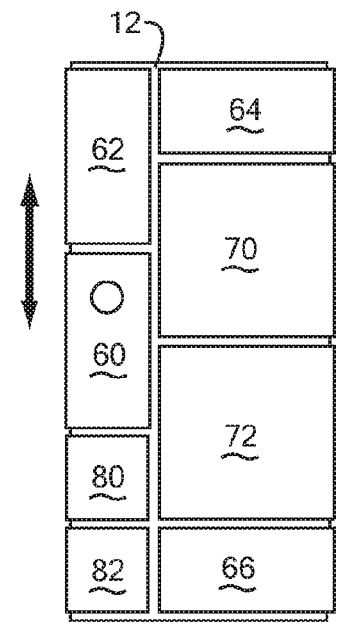
FIG. 7A                FIG. 7B

MANAGING DEVICE FUNCTIONS BASED ON PHYSICAL INTERACTION WITH DEVICE MODULES

FIELD

This application generally relates to physical interactions by a user with one or more modules of an electronic device. In particular, the application relates to identifying functions of the modules or of the electronic device based on the physical interactions and activating or facilitating the functions.

BACKGROUND

Portable electronic devices such as smart phones and tablet devices are becoming more ubiquitous as underlying technology and device capability improves. Generally, with improved technology comes more portable and advanced devices. These devices incorporate numerous components that support various device functions and applications. For example, current smart phones include components that support various types of wireless communication, image and video capture, audio and video playback, data storage, and/or the like.

Typically, smart phone manufacturers will constantly and consistently design, manufacture, and release new devices, where the new devices often incorporate upgraded or improved components as compared to the previous device iterations. However, the design, manufacture, and release cycles are costly endeavors for both the device manufacturers and for the consumers who purchase the devices. Additionally, device components evolve or improve at different rates. While some electronic devices contemplate incorporating modular components, use of such devices is cumbersome and complicated.

There is therefore an opportunity for electronic devices that support modular components, and an opportunity to effectively and efficiently manage operation of the devices based on physical interactions with and configurations of the modular components.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 1 depicts an example electronic device including hardware modules configured to connect thereto, in accordance with some embodiments.

FIGS. 2-4 depict various views of example electronic devices, in accordance with some embodiments.

FIGS. 6A, 6B, 7A, and 7B depict example interactions with hardware modules of an example electronic device, in accordance with some embodiments.

DETAILED DESCRIPTION

Figure 5:
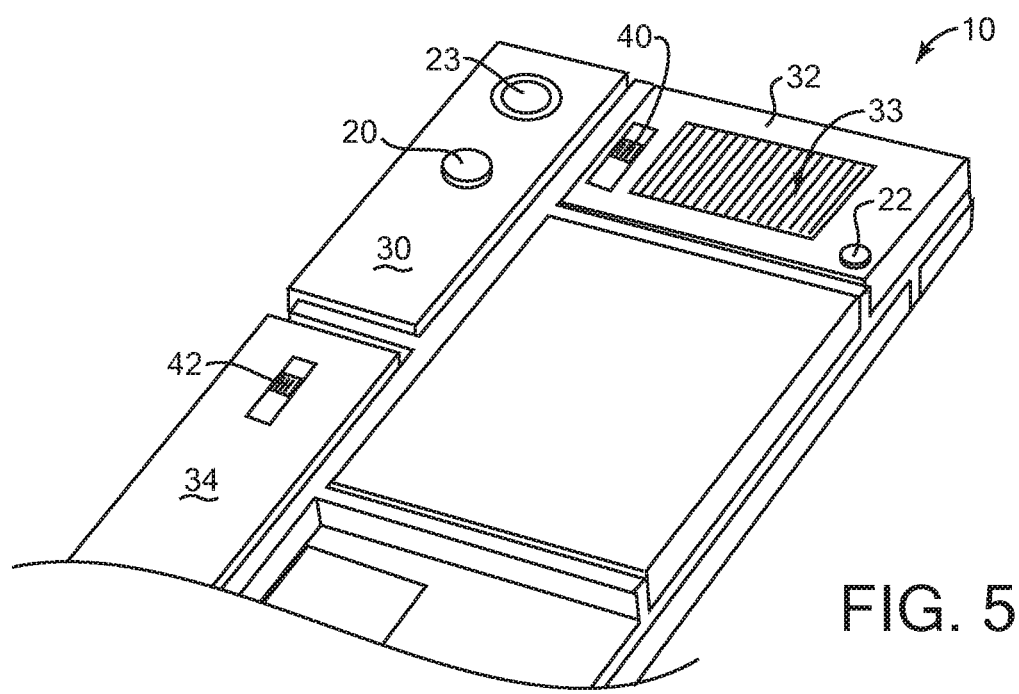
FIG. 5 depicts a detailed view of an example electronic device and components thereof, in accordance with some embodiments.

Existing portable electronic devices such as smart phones and tablet devices are capable of supporting multiple applications, functions, and the like. Generally, users of the existing devices may control which applications and functions are active or executing by making selections and interactions with existing hardware and software buttons of the devices. In particular, these devices have numerous hardware and software buttons which often require the user to make multiple individual and particular selections to accomplish a single task, such as switching from one application to another application. This is particularly apparent when an electronic device powers on or otherwise activates from an idle state, where it is often the case that an application or function desired to be accessed by the user is neither initiated nor active.

The embodiments described herein provide an electronic device that is configured with hardware modules removably secured thereto via a support housing. A user of the electronic device may manually manipulate or relocate the hardware modules to different positions of the support housing, where the support housing may incorporate various connection components that enable the electronic device to detect connections with hardware modules. The hardware modules themselves may have various functionalities incorporated therein, or may be associated with an function or application of the electronic device itself. For example, a hardware module may provide more random access memory (RAM) or processing power for the electronic device to use. In another example, a hardware module may be a camera module capable of capturing digital image data for use in an imaging application of the electronic device.

The electronic device may be configured to detect when hardware modules connect to the support housing. In response to a hardware module connecting to the support housing, the electronic device may identify a function that is associated with the hardware module, or a function or application of the electronic device that incorporates the hardware module. The electronic device may then activate the function. The electronic device may also account for how the hardware module is connected to the support housing as well as a sequence associated with multiple hardware modules connecting to the support housing.

Accordingly, by connecting various hardware modules to the support housing, users of electronic devices may control which functions or applications for the electronic device to activate in response to the electronic device detecting the connections. The embodiments as discussed herein offer a benefit to users of the electronic devices by providing easier and more intuitive control of device applications and functionalities. This benefit is especially important when the user wishes to effectively and efficiently access a desired function associated with a particular hardware module.

The systems and methods discussed herein therefore address a challenge that is particular to electronic devices. In particular, the challenge relates to a rigidity in the ability for a user to initiate desired applications or functions of electronic devices. This is particularly apparent when the user wishes to quickly access a certain application or function. Instead of requiring the user to make specific selections of specific built-in hardware or software components, as required by conventional electronic devices, the electronic devices of the present embodiments incorporate hardware modules that a user may manually connect to the electronic device, which causes the electronic device to automatically initiate functions associated with the hardware modules. Accordingly, because the systems and methods employ hardware modules connecting to support housings and having specified functions, the systems and methods are necessarily rooted in computer technology in order to overcome the noted shortcomings that specifically arise in the realm of electronic devices.

FIG. 1 depicts an example electronic device 10 capable of supporting and facilitating the features and functions as described herein. The electronic device 10 may be any type of portable electronic device, for example, a notebook computer, a mobile phone, a Personal Digital Assistant (PDA), a smart phone, a tablet computer, a multimedia player, an MP3 or MP4 player, a digital or analog broadcast receiver, a remote controller, or any other electronic apparatus. The electronic device 10 may include various electronic and mechanical features and components capable of supporting a variety of functionalities and applications, including phone and video calls, data communication, general computing and processing data, audio input and output, graphical display, sensing environmental conditions, sensing interactions with users, recording data, generating notifications, maintaining scheduling data, and/or the like.

As illustrated in FIG. 1, the electronic device 10 may include a support housing 12 that may be configured to removably secure a set of modules 14 thereto. In particular, a user may manually attach the set of modules 14 to or remove the set of modules 14 from the support housing 12. The set of modules 14 may be electrically and/or physically connected to the support housing 12 using any of a variety of connection components, such as magnetic connectors (e.g., electro-permanent magnets (EPMs)), capacitive connectors, optical connectors, or other electrical connections; physical male/female connectors or ports (e.g., ribs and recesses); and/or other fastening or connecting components.

Some implementations enable the set of modules 14 to be locked in place to the support housing 12 at a particular position within the support housing 12. For example, the set of modules 14 may be locked to the support housing 12 using a hardware locking mechanism such as a latch. According to embodiments, a power source (e.g., a battery) may be included in each of the set of modules 14 to power its own operation. The set of modules 14 may additionally or alternatively be powered by a power source provided in other modules 14 or located within the electronic device 10.

The support housing 12 may include a set of ports, receptacles, or the like (generally, a set of ports) spaced at various positions or locations, where the set of ports may be physically separated by a set of ribs and/or a set of spines that may protrude from the support housing 12. The set of ports may be configured to receive and removably secure the set of modules 14 via corresponding connector components. For example, as illustrated in FIG. 1, some of the set of modules 14 may be slid in or out of some ports of the support housing 12 as shown by arrows 16. The set of ports may be located at various positions of the support housing 12, and may be different sizes and/or include different types and/or amounts of connector components. Similarly, the set of modules 14 may be of different sizes and shapes, and may include various types and amounts of connector components.

Accordingly, various of the set of modules 14 may be compatible with some of the ports and incompatible with others of the ports. Therefore, the user may interchange some of the modules 14 in various correspondingly-sized ports of the support housing 12 if those modules 14 are physically similar in dimensions and/or include the same type and/or amount of connector components. The interchangeability of the set of modules 14 enables the electronic device 10 to achieve different physical layouts.

According to embodiments, each of the set of modules 14 may include electronic components that enable or are associated with one or more functions. Specifically, these one or more functions may contribute to or supplement operation of the electronic device 10 when the corresponding module 14 is secured to the electronic device 10 via the support housing 12. In some implementations, some of the modules 14 may include components that are used by various functions or applications of the electronic device 10. For example, the module 14 may include a lens and image sensor that is used by a camera application supported by the electronic device 10; or a display screen module 18 may include a display screen that is used by a video playback application executable by the electronic device 10. In other implementations, some of the modules 14 may provide functionality that contributes to operation of the electronic device 10. For example, various of the modules 14 may add memory to the total memory of the electronic device 10, processing capability to the total processing capability of the electronic device 10, or battery power to an overall power capability of the electronic device 10.

It should be appreciated that a variety of functions and applications associated with the modules 14 are envisioned. In one implementation, the modules 14 may be associated with communication capabilities of the electronic device 10. For example, one of the modules 14 may be a subscriber identity module (SIM) module that may include a socket (or other receptacle) to interface with a SIM card inserted in the socket, where the SIM card may store subscriber identity information for a phone carrier or other service carrier. Accordingly, different SIM cards may be inserted into or removed from the SIM module to enable different subscribers or accounts to use the electronic device 10, and/or to enable retrieval of stored personal data of a user, such as contacts and/or other data. The SIM module may also include a physical slider or switch to enable a user to select different subscriber services that may be linked to the SIM card. For example, different switch positions may correspond to different options to send/receive voice calls only (and not data), send/receive data only (such as via a data plan), or disallow phone service if roaming charges on the device would be incurred.

In some implementations, multiple of the set of modules 14 may be fastened or connected to each other via electrical and/or physical connectors. For example, magnetic connections or connectors may provide an attractive force between or among modules 14 to attach them securely to each other, but still enable a user to readily pull apart the modules 14; or physical connectors may provide physical engagement between or among some of the modules 14. Some implementations may enable wireless communication (e.g., short-range communication such as RF signals) between the modules 14 and the support housing 12, or between the modules 14 themselves. Some of the modules 14 may also be positioned in the ports of the support housing 12 so those modules 14 are adjacent to each other.

In one example implementation, the modules 14 may be display modules that each includes a display screen on its surface that may support graphical display output. The display screen on each module may extend to one or more edges of the module, and the module may include a connector to be linked directly to another module at a corresponding edge. Accordingly, each display module may be connected to another display module at corresponding edges to cause the display screens to be positioned adjacent to each other and to form a combined display screen having a larger area. A display controller of the electronic device 10 may manage the content that is displayed on the adjacent display modules such that the combined display area of the adjacent display modules acts as a single large screen, or as multiple screens defined arbitrarily within the combined display area. Some implementations enable a display screen area to be extended in horizontal and/or vertical directions of the display modules.

According to embodiments, the electronic device 10 may be physically implemented according to various configurations and may support multiple ways for the modules 14 to connect to the support housing 12. In particular, the electronic device 10 may include one or more layers, where each layer may define a plane of the support housing 12 and that may removably secure multiple of the modules 14. In some implementations in which the electronic device 10 includes multiple layers, each layer may be aligned parallel to the other layers.

FIG. 2 depicts a side view of the electronic device 10 described with respect to FIG. 1. The electronic device 10 depicted in FIG. 2 includes two layers: a rear layer 20 (which is shown facing up in FIG. 1) and a front layer 22 (which is shown facing down in FIG. 1). The rear layer 20 may removably secure a first set of modules that may be arranged within a plane and the front layer 22 may removably secure a second set of modules that may be arranged within another plane, where the rear layer 20 and the front layer 22 may be aligned parallel to each other. The support housing 12 may accordingly include a first side associated with the rear layer 20 and a second side associated with the front layer 22, where the first side and the second side may include ports having the same or different amount, type, and size to respectively removably secure the first set of modules and the second set of modules. For example, the front layer 22 may face the user during normal use of the electronic device 10 and may accordingly include a larger port for securing the display screen module 18 that may be larger than other modules.

FIG. 3 depicts another example implementation of an electronic device having a single layer 24 of modules arranged within a plane and connected to the electronic device via the support housing 12. It should be appreciated that a single electronic device may also support more than two layers, where the multiple layers may be aligned parallel with each other and may be the same or different sizes. FIG. 4 depicts an example implementation of an electronic device having three layers: a front layer 30, a middle layer 32, and a rear layer 34, where each layer is arranged within a plane and parallel to the other layers.

As shown in FIG. 4, the middle layer 32 is provided between the front layer 30 and the rear layer 34. It should be appreciated that the modules of the middle layer 32 may be accessed and/or removed in various ways. In some implementations, one or more layers themselves may be removable or separable from the electronic device, where the electronic device may include multiple individual support housings. For example, a layer of modules may be connected to its own support housing, where that support housing may be connected to the support housing(s) associated with the other layers.

FIG. 4 depicts a main support housing 12 that may support the front layer 30 and the middle layer 32, similar to the support housing 12 depicted in FIGS. 1 and 2. The electronic device of FIG. 4 also includes an extension support housing 13 that may support the rear layer 34 to which several modules 28 may be removably secured. The extension support housing 13 may be coupled to the main support housing 12 at an interface 15 (e.g., a mechanical, magnetic, or electrical connection mechanism). The main support housing 12 and the extension support housing 13 may be detached from each other to enable access to or removal of the modules of the middle layer 32.

In additional implementations for supporting multiple layers, the electronic device may include hinges or similar mechanisms to enable a layer of modules to pivot with respect to the other layer(s) of modules, thereby enabling a user to access an internal layer of modules and/or other areas of the electronic device. Other implementations may support internal layers of modules having edges that extend from or protrude past edges of the modules of the surrounding layers, therefore enabling the user to easily insert and remove the internal modules.

Some electronic devices may include a support housing configured to connect to a support housing of another electronic device, thereby enabling the electronic devices to connect together. For example, instead of the layer 34 of FIG. 4 being an extension layer with an extension support housing 13 that is attached to the main support housing 12, the layer 34 may be a second, separate electronic device that can function independently of the first electronic device that includes the main support housing 12. Accordingly, the second electronic device may include its own support housing that may attach to the support housing 12 of the first electronic device. In this implementation, the extension support housing 13 may be a separate linking structure (in some cases, without any modules attached) that may attach between the first electronic device and the second electronic device to mechanically connect the two electronic devices together. In other implementations, two electronic devices may be connected together at their edges (e.g., via a linking structure that may be positioned between the two electronic devices to mechanically connect them). Such edge-connected devices may offer improved features, such as a larger combined display area that may incorporate display modules from both electronic devices.

FIG. 5 is a detailed view of the electronic device 10 depicting various features and components as well as a set of modules 30, 32, 34 thereof. The modules 30, 32 may include buttons 20, 22 respectively positioned thereon. Similarly, the modules 32, 34 may include slider switches 40, 42 respectively positioned thereon. The buttons 20, 22 and the slider switches 40, 42 may be pressed, touched, switched, or otherwise physically manipulated or actuated by a user. The buttons 20, 22 and the slider switches 40, 42 may be positioned on an outer surface of the corresponding module 30, 32, 34 or otherwise on a surface that is accessible to a user while the corresponding module 30, 32, 34 is secured to the support housing.

While FIG. 5 depicts the buttons 20, 22, and the slider switches 40, 42, it should be appreciated that other types of physical controls are envisioned, including switches, knobs, directional pads, trackpads or other sensor pads, touchscreens, hinges, joysticks, optical sensors, capacitive sensors, and/or the like. Some types of physical controls may be positioned or disposed at least partially within the corresponding module, such as a capacitive sensor capable of detecting touch input. Some physical controls may be configured to sense multiple simultaneous touches or other manipulations, such as trackpads and touchscreens.

According to embodiments, the actuation of a physical control on a module by a user may cause an activation of a function associated with the module. For example, an input/output device incorporated in a module may be activated/enabled and deactivated/disabled by the actuation or manipulation of a physical control. In some implementations, actuation of a physical control may activate or deactivate functions that are provided by the module to the electronic device, such as processing capability, memory expansion, battery power addition, sensing capability, a function of the device operating system or running environment, and/or the like. In other implementations, actuation of a physical control may activate/deactivate and/or adjust certain settings of the electronic device, such as scaling levels, parameters associated with module functions, and/or other device settings.

By having certain physical controls present on the modules themselves, the modules are more interchangeable. If a particular function for a specific module is desired (or not desired), a user can add (or remove) the specific module to (or from) the support housing of the electronic device, and the physical controls for that function will be added (or removed) as well. For example, if a user decides that a camera module for an electronic device is not wanted or needed, the user can remove the camera module and replace it with another module (e.g., a battery module that supplies additional power to the electronic device).

As discussed herein, numerous types of modules and functions thereof are envisioned. For example, the module 30 of FIG. 5 may be a camera module that may include a lens 23, charge-coupled device (CCD), image sensor, circuitry, memory, and/or any other components that may be used to support image capture functionalities. In this example, the button 20 on the surface of the camera module 30 may be used as a shutter control to capture an image and start/stop recording a video. In some implementations, the button 20 may be linked to other camera functions that may be indicated on a display screen located on the camera module 30 or on another module, such as a display screen module.

For further example, the module 32 of FIG. 5 may be a speaker module that may include one or more speakers 33 capable of outputting audio according to applied electrical signals. The slider switch 40 on the speaker module 32 may enable a user to adjust the volume of the audio that is output from the speaker(s) 33. In some implementations, multiple speaker modules of an electronic device may each include their own independent volume slider, or the user may designate one of the volume sliders as a master volume control that controls all the speaker modules. The button 22 on the speaker module 32 may, in some scenarios, enable/disable the audio output from the speaker(s) 33. Other physical controls are envisioned for the speaker module 32, such as selections that may adjust various settings of the audio output, such as tone, balance, equalization levels, fade, bass, treble, and/or the like.

It should be appreciated that other types of modules having physical controls that may activate, deactivate, adjust, or otherwise control a variety of different functions are envisioned. For example, the modules may include an activity monitoring module having heartrate sensors, blood pressure sensors, oxygen level sensors, and/or the like, a location module having a GPS sensor, and/or others. The physical controls provided on the modules may also be used to control overall device functions or modes, and/or control functions of other modules secured to the device. In one example, a module can include several controls that may each be assigned to a different function of the device wherein, in some cases, the module itself may not have any other functions except to support the controls.

It should further be appreciated that the physical controls on the modules may control a variety of functions of the electronic device. For example, a particular control may activate an unlock feature for the electronic device such that operating system is "unlocked" when the control is actuated. Other controllable device functions may include power on/off, selection of modes (sleep mode, low power mode, etc.), display screen activation, GPS sensor activation, launching of particular applications or other software on the electronic device, controlling of various settings and user preferences, enabling and disabling notifications, and/or others.

As discussed herein, a user of the electronic device may move, rotate, relocate, or otherwise physically change the modules within a support housing and/or in relation to other modules secured to the support housing. According to embodiments, this movement or physical change may be associated with certain functions that may be managed by the electronic device.

FIGS. 6A and 6B depict examples of physical movements of a module 50, by a user, in association with a support housing 12. As depicted in FIG. 6A, the user may move the module 50 to the left as indicated by arrow 52 to remove the module 50 from the support housing 12. According to some embodiments, the module 50 may be "unlocked" prior to being removed via a physical interaction or a software command. Similarly, as depicted in FIG. 6B, the user may move the module 50 to the right as indicated by arrow 54 to secure the module 50 to the support housing 12. In some implementations, a group (e.g., a row or column) of adjacent modules may be moved together in relation to the support housing 12. For example, if a group of multiple modules are attached directly to each other within adjacent ports of the support housing 12, then the user may remove the entire group of modules from the support housing 12.

FIGS. 7A and 7B depict additional examples of physical movement of modules in relation to the support housing 12. As depicted in FIG. 7A, a module 60 is positioned in the upper left corner of the support housing 12 and a same- or similar-sized module 62 is positioned under the module 60. In one implementation, the user may remove the modules 60, 62 by detaching the modules 60, 62 from the support housing 12 and sliding the modules 60, 62 to the left, away from the support housing 12.

The user may then re-secure the modules 60, 62 to the support housing 12, but with the modules 60, 62 switching positions as depicted in FIG. 7B (i.e., the module 62 is now positioned in the upper left corner and the module 60 is positioned under the module 62). A similar swapping of modules may be made between same- or similarly-sized modules 64 and 66, modules 70 and 72, and modules 80 and 82.

According to embodiments, a processor or controller of the electronic device may sense the movement of the modules (such as those described with respect to FIGS. 6A, 6B, 7A, and 7B). In some implementations, the processor may detect change(s) in module connection(s) to the support housing 12, such as when a user moves a module to a different position of the support housing 12. Generally, the processor may detect the original positions of the modules according to their original connections to the support housing 12, and may detect new positions of the modules according to their new connections to the support housing 12.

In some implementations, the support housing 12 may include sensors that may be configured to detect any motion of modules within the support housing 12. The sensors may be, for example, optical sensors, magnetic sensors, and/or other types of sensors. The modules themselves may, in some cases, include motion sensors (e.g., accelerometers, gyroscopes) that may be used as an alternative to or in combination with any sensors of the support housing 12. The sensors may be configured to detect a movement direction associated with a module connecting to the support housing 12. For example, the module may connect to the support housing 12 from the left, the right, the bottom, or the top.

According to embodiments, the processor may detect connections of the modules and may facilitate functions or applications associated with the modules and/or the device. In particular, the processor may detect a connection of a module to the support housing 12, may identify a function to activate, where the function may correspond to a function of the module itself or of the electronic device, and may activate the function. A function of the electronic device may constitute an application installed on the electronic device, where the application may use the connected module, or may constitute a setting or mode modification or other similar function. In some implementations, the processor may determine the function based at least in part on a movement direction associated with the module connecting to the support housing 12.

For example, the processor may detect a module being removed from a particular port of the support housing 12 and then replaced into the same port of the support housing 12, as depicted in FIGS. 6A and 6B, which the processor may determine corresponds to an unlocking of a device operating system to enable the user to access functions of the electronic device. For further example, the processor may detect two modules switching port positions, as depicted in FIGS. 7A and 7B, which the processor may determine corresponds to a resetting of a device operating system to a starting state. In determining or identifying the function, the processor may compare the detected movement of the module(s) to a listing of the corresponding functions, such as via a lookup table, list, or other data structure.

The movement and placement of certain modules by a user may also be linked to one or more functions of the moved modules themselves. For example, an input/output device incorporated into a module may be activated/enabled or deactivated/disabled by the movement of that same module. Similarly, the movement of certain modules may be linked to one or more functions that are provided by the modules to the electronic device. For example, movement of a certain module may cause activation or deactivation of processing capability, memory size, sensing capability, or a function of the device operating system or running environment. Additionally, certain settings, scaling levels, and other parameters of certain module functions and/or device functions may be adjusted based on manipulation or movement of the modules by the user.

It should be appreciated that the processor may activate a variety of other functions in response to detecting various movements, repositionings, and/or relocations of the modules into, out of, and/or within the support housing 12. Further, the movements, repositionings, and/or relocations may incorporate a single module or a combination of multiple modules. Some of these additional functions may include, but are not limited to, enabling and disabling a sleep mode; enabling and disabling certain communication functions such as "airplane mode" or the ability to initiate or receive telephone calls; enabling and disabling notifications to be selectively displayed or output based on calendar events, received communications, sensed environment conditions, or other conditions; activating a particular application, enabling and disabling certain communication settings (e.g., Bluetooth®, WLAN hotspot); enabling and disabling an input/output component of the device (e.g., a speaker, alarm, siren, camera flash, vibration); and/or the like.

The support housing 12 may also be configured to enable a module to be positioned in different orientations. In one implementation, the module may include multiple connectors or contacts in multiple location, such as on opposing edges or sides of the module, so that the module may be rotated (e.g., 180 degrees) and connected to the support housing 12 in a different orientation. In another implementation, a symmetrical module (e.g., a square or circular shaped module) may include a connector on more than two edges or sides of the module, thereby enabling the module to have multiple connectable orientations.

The processor may detect or sense changes in orientation of the module in various ways, such as based on the combination of connectors engaged on the support housing 12, based on an output of motion or position sensors within the module or on the support housing, and/or based on other factors. The processor may also facilitate the activation or deactivation of one or more functions of the electronic device and/or a module itself in response to detecting a reorientation of the module. Each orientation of the module, or each change of the module from one connectable orientation to another connectable orientation, may be associated with a different function or set of functions of the electronic device and/or the module.

In some implementations, the processor may use data associated with the movement and/or orienting of modules as input to applications supported by the electronic device, such as games, puzzles, or other applications. For example, the electronic device may store a predetermined sequence of module movements, such that if the user moves/orients a set of modules to match the predetermined sequence, a puzzle may be solved, a game goal may be scored, and/or a function associated with the device and/or an application running on the device may be unlocked. For further example, the processor may cause "easter eggs" (e.g., a message, image, or animation displayed on a display screen of the device), which may be hidden by developers in the source code of applications, to be revealed in response to detecting the movement of particular module(s) in a particular way and/or in a particular sequence, or to a particular position(s) within the support housing 12.

The present embodiments further contemplate facilitating various functionalities in response to the electronic device powering on, starting up, or otherwise activating. Electronic device startup may occur when the electronic device changes from a powered down, sleep, or idle state to a powered on, active, or awake state. Startup of the electronic device may be activated in a variety of ways.

Generally, the electronic device may detect an activation of a device component, such as when a user activates a control on the electronic device (e.g., a power button), the electronic device starts up or is powered on, a timer expires, a trigger event associated with the component occurs, an event or condition occurs, and/or the like. The electronic device may identify or select particular functions (e.g., particular application(s) or mode(s)) to be active upon startup. Therefore, a user may conveniently use or interface with the startup functions without having to first select a particular mode or application using the electronic device.

The functions that are initiated by the electronic device upon device startup may vary based on the physical arrangement of one or more modules in the electronic device. In some implementations, the startup functions may be based on one or more particular modules located at or secured to one or more predetermined controlling positions of the support housing, where a module at a controlling position may be associated with a particular application, mode, or other function that the electronic device may initiate upon device startup. It should be appreciated that the controlling position(s) may be a default position(s) or may be configurable by a user of the electronic device.

Figure 8:
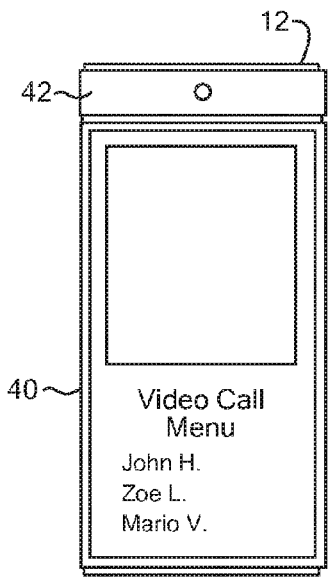
FIGS. 8 and 9 depict example electronic devices with example functionalities activated, in accordance with some embodiments.

FIG. 8 depicts an example of a front side of an electronic device, which includes a display screen module 40 secured to a lower position of the support housing 12 and a camera module 42 secured to a different position of the support housing 12. In an implementation, the camera module 42 may include an image sensor as well as a microphone component. If the camera module 42 is secured to a controlling position of the support housing 12, then the electronic device may identify a function associated with the camera module 42 to initiate or activate upon device startup. The function activation by the electronic device may utilize one or more additional modules. For example, as depicted in FIG. 8, the electronic device may initiate a video call application as displayed on the display screen module 40. The user may interface with the camera module 42 and/or the video call application to record and send image data associated with the user's face during the video call.

Figure 9:
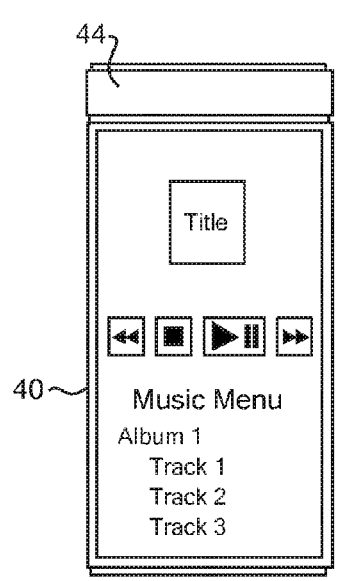

FIG. 9 depicts another example of the front side of the electronic device in which a speaker module 44 is secured to the position of the support housing 12 previously occupied by the camera module 42. In response to detecting that the speaker module 44 is connected to the controlling position of the support housing 12 upon device startup, the electronic device may identify and initiate a music playback application associated with the speaker module 44, as displayed on the display screen module 40. The music playback application may cause a speaker of the speaker module 44 to output audio as controlled by the music playback application. In some implementations, the music playback application may continue output of the song or track that was output the previous time that the music playback application was active or initiated. It should be appreciated that the speaker module 44 may include additional components such as a headphone jack and/or others.

Figure 10:
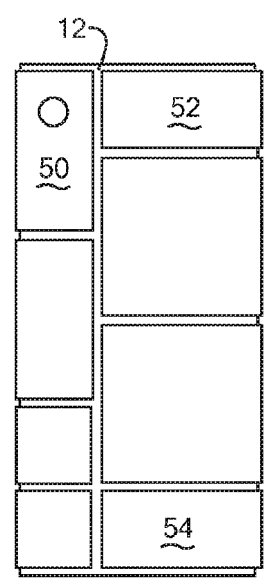
FIGS. 10 and 11 depict example electronic devices including hardware modules configured to connect thereto, in accordance with some embodiments.

It should be appreciated that either or both of the front side and the rear side of the electronic device may include one or more controlling positions. For example, as depicted in FIG. 10, if a camera module 50 is positioned at a controlling position designated as the top left corner of the electronic device, then the electronic device may initiate in a camera mode (e.g., executing a camera application) in which a display screen of the device (e.g., the display module 40 of FIGS. 8 and 9) may display a live preview of image data captured by the camera module 50. In some implementations, the display screen may display a list of previously-captured images, and/or other content or information associated with an imaging or photos application.

The controlling position of the support housing 12 of the electronic device may vary. For example, as depicted in FIG. 10, if the controlling position of the support housing 12 is where a speaker module 52 is positioned, then the electronic device may initiate a music playback application associated with the speaker module 52 upon device startup. In another example, if the controlling position of the support housing 12 is where a SIM module 54 (or other type of module related to a particular service carrier) is positioned, then the electronic device may initiate a communication application (e.g., a dialer) associated with the SIM module 54 upon device startup. For further example, if a base processor module is positioned at a controlling position (not shown in FIG. 10), the electronic device may initiate in a default mode in which no particular application is executing. The controlling position may also be associated with other positions or components of the support housing 12, such as a center position, a bezel, a particular small-sized position, or the like.

As discussed above, various electronic device implementations may include different amounts of layers of the support housing 12 as well as various controlling positions. In some implementations, the front layer of modules of an electronic device, such as those facing the user in normal operation of the electronic device, may dictate the function(s) for the electronic device to initiate upon device startup. In other implementations, a non-front layer of the electronic device (e.g., a rear layer) may dictate the startup functions, such as when any front layer modules are general usage modules and/or may not have an associated application. It should be appreciated that other layers of the electronic device may dictate the startup functions in other implementations or under other conditions. In one embodiment, a user may designate which layer of the electronic device dictates a startup function(s) for each controlling position of the support housing 12.

In some implementations, the controlling position may result from multiple modules or devices that may be connected together. For example, if two display screen modules (or electronic devices) are connected together at their edges to form a combined larger display screen (or larger electronic device), the electronic device may detect that such display screen modules (or electronic devices) are connected together and may initiate a display application upon device startup, such as a video playback application or video conference application.

The electronic device may also support multiple controlling positions, where the electronic device may use certain criteria to resolve conflicts between which function or application is to be initiated if two or more modules are located in the controlling positions. For example, the electronic device may resolve a conflict based on module size, where a larger module would have priority over a smaller module. For further example, a module positioned closer to the top of the electronic device may have priority over a module positioned farther from the top. The electronic device may resolve conflicts using a default set of rules which may be configurable by a user. In some implementations, a user may specify a priority list of applications or functions, such that if there is a conflict between applications or functions associated with modules in the controlling positions, the electronic device may initiate the application or function highest on the priority list upon startup.

In some implementations at device startup, the electronic device may initiate an application related to a module located in a non-standard or atypical position of the support housing 12 for that particular module. For example, if a speaker module has a standard position on the rear layer of the electronic device, but the speaker module is currently positioned on the front layer of the electronic device, then upon startup the electronic device may initiate a music playback application. Similarly, if a camera module has a standard position on the rear layer (e.g., to enable a user to take pictures while viewing a display screen on the front side of the device), then the electronic device may start up in a normal camera mode if that camera module is in a controlling position on the rear layer. However, if that same camera module is in a non-standard position such as a position on the front layer, then upon startup the electronic device may initiate a communication application that enables a video call using the camera module. The user of the electronic device may configure or set the standard or non-standard controlling position(s) and the corresponding function(s) or application(s) that are initiated upon device startup.

In some implementations, the electronic device may account for the positions of multiple modules to determine which functions or applications are initiated upon startup of the device. For example, the electronic device may determine a set of functions or applications that corresponds to a set of modules that forms a top edge of the electronic device, such that each of the set of functions or applications is initiated upon device startup. The electronic device may therefore concurrently execute multiple applications or functions (i.e., multitask), whereby the multiple applications or functions may share the display screen, or whereby the electronic device may display one of the applications in the foreground while executing the remaining applications in the background. For example, the electronic device may identify the application to be displayed in the foreground as corresponding to a module located in a controlling position within the top edge area, having a particular size, or being associated with a particular application, and may accordingly display the application in the foreground.

The electronic device may also determine a startup application or function based on a combination of multiple modules in multiple controlling positions, whereby different combinations of modules may be associated with particular applications or functions. For example, a combination of a camera module and a microphone module on the top edge of an electronic device may correspond to the electronic device initiating a video recording application upon startup. The electronic device may maintain a list, lookup table, or other data structure that specifies which combinations of modules correspond to which applications or functions, which may also be configurable by a user.

In some implementations, the electronic device may account for the spatial orientation of the electronic device at the time of device startup to determine which module dictates the startup application or function of the electronic device. The electronic device may determine its orientation using various methods, such as via sensor data from motion and/or orientation sensors. In some implementations, in order for a module to dictate the startup application or function of the electronic device, that module must be in a controlling position of the support housing 12 and also currently be in a controlling orientation based on its orientation with respect to the rest of the modules of the electronic device. In one example, the controlling orientation may be defined as being at the highest elevation with respect to the ground compared to the other modules of the electronic device, such as if the electronic device is tilted.

Figure 11:
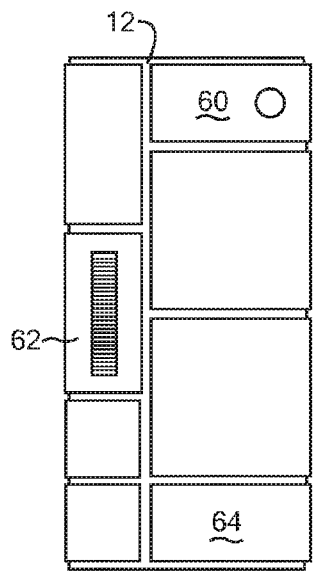

FIG. 11 depicts an example electronic device having three modules on its rear layer: a camera module 60 associated with a camera application in a controlling position of the support housing 12 adjacent to a top side of the electronic device, a speaker module 62 associated with a music playback application in a controlling position of the support housing 12 adjacent to a left side of the electronic device, and a SIM module 64 associated with a communication application in a controlling position of the support housing 12 adjacent to a bottom side of the electronic device. It may be assumed that the modules of the rear layer (versus the modules of the front layer) have a controlling position, and that the controlling orientation may be defined as being at the highest elevation with respect to the ground compared to the other modules of the electronic device.

Figure 12:
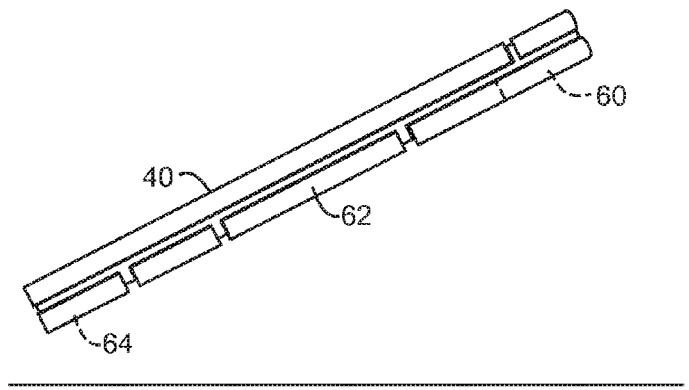
FIG. 12 depicts an example electronic device positioned in an example orientation, in accordance with some embodiments.

FIG. 12 depicts the electronic device having its top side lifted from a surface such that the top side of the electronic device is higher than the left and right sides (i.e., the electronic device is tilted such that the top side is highest in relation to the ground). In this position and orientation, the camera module 60 on the top side of the rear layer is at the highest elevation relative to the other modules 62, 64 and accordingly dictates the startup application, which is the camera application. Therefore, the electronic device may initiate the camera application upon device startup. Similarly, if the left side of the electronic device was held highest at time of device startup, the electronic device may initiate the music playback application associated with the speaker module 62. Likewise, if the bottom side of the electronic device was held highest at the time of device startup, the electronic device may initiate the communication application associated with SIM module 64. In some implementations, if a module is positioned in a controlling corner position of the support housing 12 and the corner is the highest-positioned corner of the electronic device at the time of startup, then the module positioned at the corner may dictate the startup application or function.

The user of the electronic device may specify which sides or corners of the electronic device dictate the startup application or function if those sides/corners are oriented in the highest position at the time of device startup. In some implementations, the electronic device may determine whether a particular side of the device was continuously oriented in the highest position, such as for a threshold amount of time before, during, and/or after startup, whereby if the threshold is not met, the electronic device will not initiate the associated application or function. Additional or alternative controlling orientations may be defined, such as a lowest elevation compared to the rest of the modules, an orientation based on magnetic poles, and/or others. In some implementations, if the electronic device is held approximately horizontally (e.g., parallel to the ground), then a module at a designated controlling position may dictate the application or function at device startup, such as a module at or near the center of the electronic device.

In addition to the modules dictating applications or functions at the time of device startup, the positions of the modules in the electronic device may dictate applications or functions during use of the electronic device. In one example, if a user moves a module from a non-controlling position to a controlling position of the support housing 12 while the electronic device is active (i.e., neither off nor in a sleep or idle state), then the electronic device may automatically initiate an application or function that is associated with that module.

In some implementations, the physical orientation of the electronic device may also influence which application or function related to a module in a controlling position is active and running on the electronic device. In particular, a module in a controlling position may dictate the active application if the module is also in a controlling orientation (e.g., the module is at the highest elevation of all the modules), as similarly described above with respect to startup applications or functions. It should be appreciated that various controlling positions and controlling orientations may be predefined, such as by the user of the electronic device.

In one example, if the camera module 60 is adjacent to a top edge of the electronic device and the speaker module 62 is adjacent to a left edge of the device, such as depicted in FIG. 11, then the electronic device may activate a camera application if the electronic device detects that its top edge is oriented "up" with respect to the ground. During device use, if the electronic device detects that its left edge and accordingly the speaker module 62 is oriented "up" (e.g., the user rotates the device ninety (90) degrees during use), then the electronic device may automatically activate or initiate a music playback application associated with the speaker module 62 while closing or moving to the background the previously-active camera application. As a result, the user may manually designate which application is active by positioning desired modules at controlling positions (e.g., an edge position of the device), and orienting the electronic device in a controlling orientation (e.g., so that a particular desired edge is highest).

Figure 13:
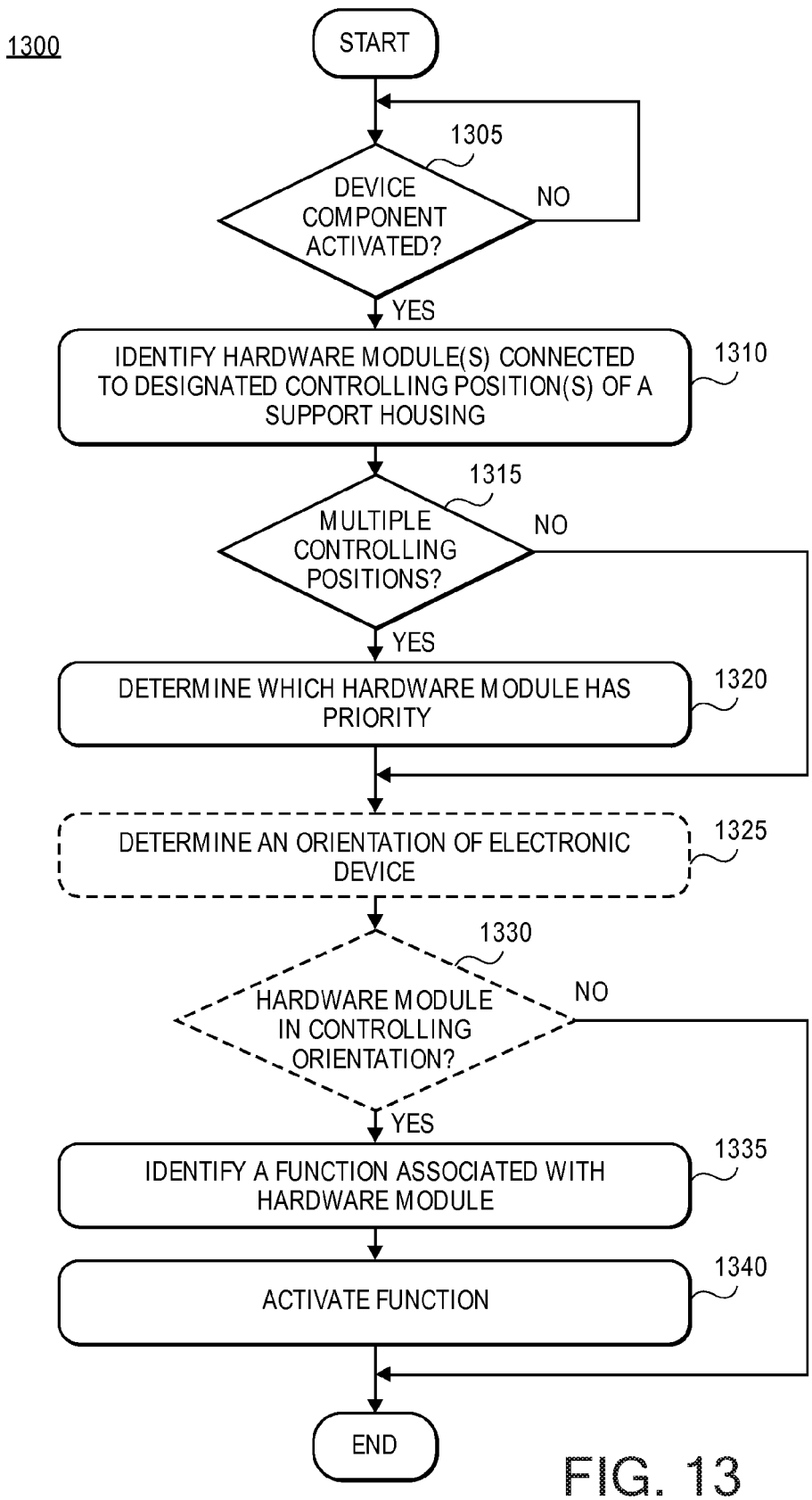
FIG. 13 depicts a flow diagram of facilitating electronic device functionalities in response to hardware module positioning, in accordance with some embodiments.

FIG. 13 is a flowchart of a method 1300 for an electronic device (such as the electronic device 10) to detect device activation and initiate a function corresponding to a module in a controlling position of the electronic device. The order of the steps of the depicted flowchart of FIG. 13 may differ from the version shown, and certain steps may be eliminated, and/or certain other ones may be added, depending upon the implementation.

The method 1300 begins with the electronic device monitoring (block 1305) for a device component activation, or otherwise detecting that a device component is activated. According to embodiments, the device component activation may occur when the electronic device starts up or is powered on, when a timer expires, when a trigger event associated with the component is detected, when a user activates, selects, or actuates the component, or in response to other triggers or events. The device component may correspond to a hardware or software button of the electronic device, and the component activation may be an interaction with or selection of the hardware or software button.

If the electronic device does not detect a device component activation ("NO"), the electronic device may continue monitoring for the activation. If the electronic device does detect a device component activation ("YES"), the electronic device may identify (block 1310) any hardware module(s) connected to designated controlling position(s) of a support housing of the electronic device. In embodiments, the designated controlling position(s) may be default position(s) or configurable by a user of the electronic device. The electronic device may identify the hardware module(s) connected to the designated controlling position(s) via one or more of a variety of connectors.

After identifying the hardware module(s), the electronic device may determine (block 1315) whether there are multiple hardware modules connected to multiple controlling positions. If there are multiple hardware modules connected to multiple controlling positions ("YES"), the electronic device may determine (block 1320) which hardware module has priority. In particular, the electronic device may examine a list, lookup table, or other data structure that specifies criteria or rules for determining priority, where the priority may be based on a size or type of the hardware module(s), a location of the controlling position(s), a type of application or function associated with the hardware module(s), and/or other parameters. The electronic device may also determine whether the hardware module is a position that is atypical for that type of hardware module. If there are not multiple hardware modules connected to multiple controlling positions ("NO"), processing may proceed to block 1325.

In some optional implementations, the electronic device may determine (block 1325) its orientation. In embodiments, the electronic device may determine its orientation using sensor data gathered from one or more built-in sensors, such as a vector sensor, gyroscope, and/or the like, or according to other techniques. The electronic device may also optionally determine (block 1330) whether the hardware module is in a controlling orientation. For example, the controlling orientation may be specified as the module in the "highest" position relative to ground. It should be appreciated that other controlling orientations are envisioned.

If the hardware module is not in the controlling orientation ("NO"), then processing may end or proceed to other functionality. If the hardware module is in the controlling orientation ("YES"), then the electronic device may identify (block 1335) a function associated with the hardware module. As discussed herein, the function may be a built-in function or use associated with a component of the hardware module, or a built-in function or application of the electronic device that uses or incorporates a component of the hardware module. After identifying the function, the electronic device may activate (block 1340) the function, such as by initiating the function or application associated with the hardware module itself or with the electronic device. Accordingly, the electronic device may automatically facilitate various functions in response to detecting manual positioning of hardware modules by a user of the electronic device.

Figure 14:
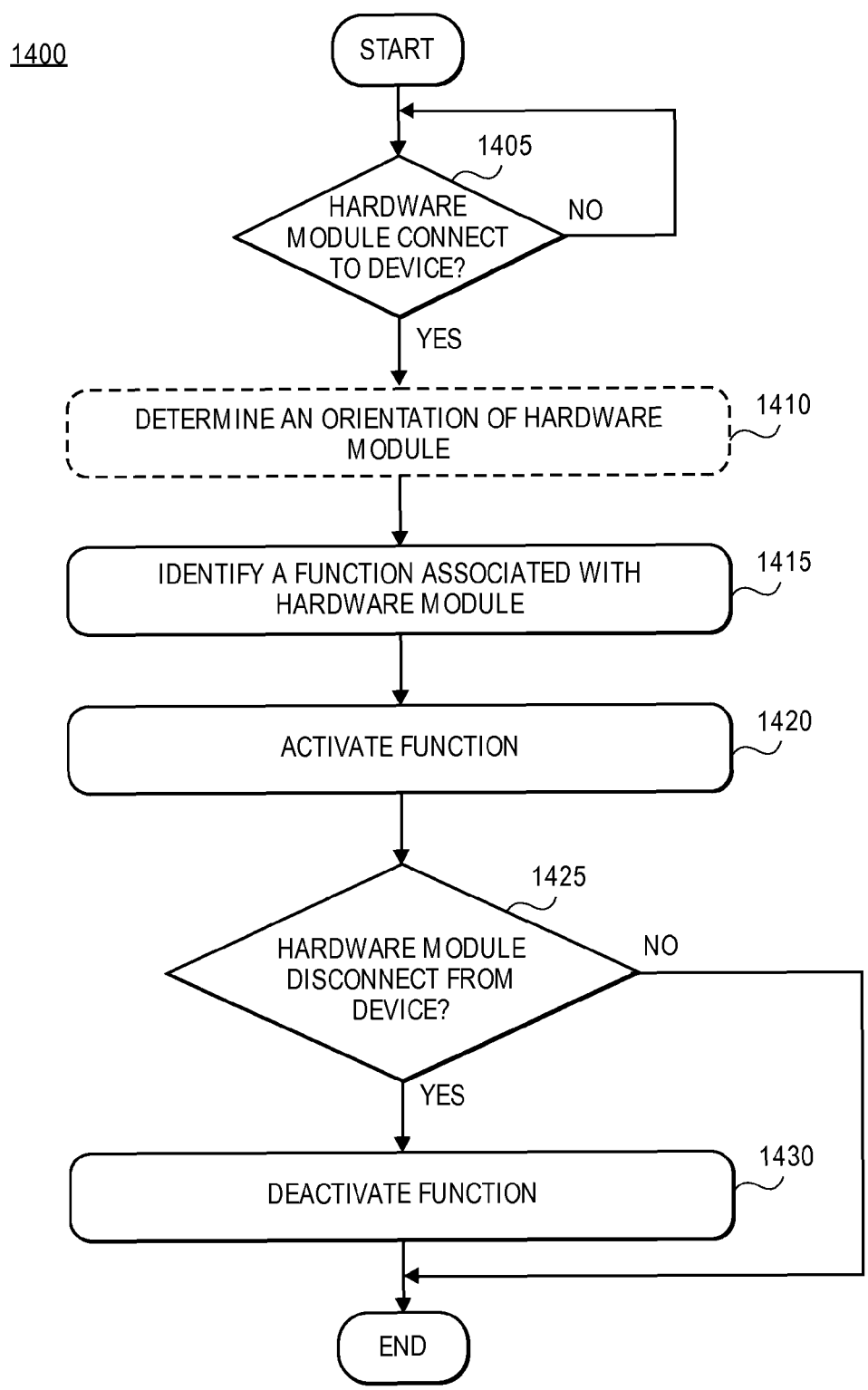
FIG. 14 depicts a flow diagram of activating device functions based on configurations of hardware modules, in accordance with some embodiments.

FIG. 14 is a flowchart of a method 1400 for an electronic device (such as the electronic device 10) to detect a hardware module connecting thereto and initiate a function corresponding to the hardware module. The order of the steps of the depicted flowchart of FIG. 14 may differ from the version shown, and certain steps may be eliminated, and/or certain other ones may be added, depending upon the implementation.

The method 1400 begins with the electronic device monitoring (block 1405) for a hardware module to connect to a support housing of the electronic device, where the hardware module may connect to the support housing via a connector component. If the electronic device does not detect a hardware module connection ("NO"), the electronic device may continue monitoring for the connection. If the electronic device does detect a hardware module connection ("YES"), the electronic device may optionally determine (block 1410) an orientation of the connected hardware module. In particular, the hardware module may include multiple connector components that enable the hardware module to connect to the support housing in multiple ways or orientations.

The electronic device may also identify (block 1415) a function associated with the hardware module connected to the support housing. The identification of the function may be based, at least in part, on the orientation determined in block 1410. As discussed herein, the function may be a built-in function or use associated with a component of the hardware module, or a built-in function or application of the electronic device that uses or incorporates a component of the hardware module. After identifying the function, the electronic device may activate (block 1420) the function, such as by initiating the function or application associated with the hardware module itself or with the electronic device.

The electronic device may also monitor (block 1425) for the hardware module disconnecting from the support housing, such as if a user manually removes the hardware module from the support housing. If the electronic device does not detect the hardware module disconnecting from the support housing ("NO"), then processing may end, return to the start, continue to monitor for the hardware module to disconnect, or proceed to other functionality. If the electronic device does detect the hardware module disconnecting from the support housing ("YES"), then the electronic device may deactivate (block 1430) the function. In embodiments, the electronic device may return to a previously-activated application or function, enter an idle state, enter a default state, or proceed to other functionality.

Figure 15:
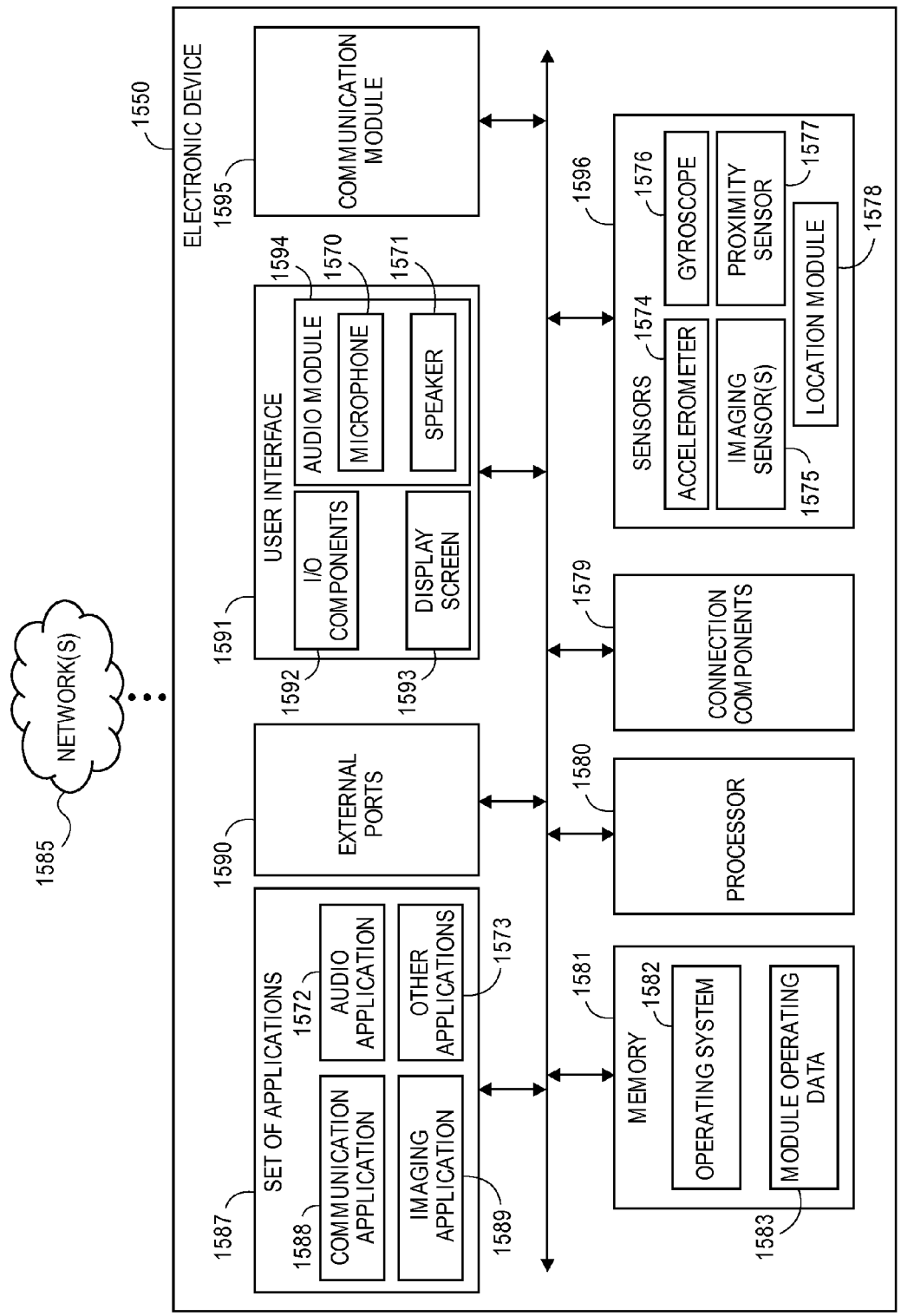
FIG. 15 is a block diagram of an electronic device in accordance with some embodiments.

FIG. 15 illustrates an example electronic device 1550 (such as the electronic device 10 discussed with respect to FIG. 1, or other devices) in which the functionalities as discussed may be implemented. The electronic device 1550 may include a processor 1580 or other similar type of controller module or microcontroller, as well as a memory 1581. The processor 1580 may include a singular processor or may include more than one separate processor such as: an application processor to manage a set of applications 1587 and a user interface 1591 of the electronic device 1550, a sensor processor to manage sensor 1596 data, and an audio processor to process audio 1594 data.

The memory 1581 may store an operating system 1582 capable of facilitating the functionalities discussed. The processor 1580 may interface with the memory 1581 to execute the operating system 1582 and the set of applications 1587. The set of applications 1587 (which the memory 1581 may also store) may include a communications application 1588 configured to facilitate various communications, an imaging application 1589 configured to capture digital image and video data, and an audio application 1572 configured to manage audio playback. The set of applications 1587 may also include one or more other applications 1573 such as, for example, music and entertainment applications, phone applications, messaging applications, calendar applications, social networking applications, utilities, productivity applications, games, travel applications, communication application, shopping applications, finance applications, sports applications, photography applications, mapping applications, weather applications, applications for connecting to an online marketplace, and/or other applications.

The memory 1581 may further store module operating data 1583 that indicates various information associated with modules and functions/applications corresponding thereto, including controlling position data; pairings among modules, controlling positions, controlling orientations, and associated functions/applications; priority or conflict data; and/or the like. Generally, the memory 1581 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 1550 may further include a communication module 1595 configured to interface with one or more external ports 1590 to communicate data via one or more wired or wireless networks 1585. For example, the communication module 1595 may leverage the external ports 1590 to establish a wide area network for connecting the electronic device 1550 to other components such as a remote data server. According to some embodiments, the communication module 1595 may include one or more transceivers functioning in accordance with IEEE standards, 3GPP standards, or other standards, and configured to receive and transmit data via the one or more external ports 1590. More particularly, the communication module 1595 may include one or more WWAN, WLAN, and/or WPAN transceivers configured to connect the electronic device 1550 to wide area networks, local area networks, and/or personal area networks.

The electronic device 1550 may further include one or more sensors 1596 such as one or more accelerometers 1574, gyroscopes 1576, imaging sensors 1575, proximity sensors 1577, and one or more location modules 1578. The sensors 1596 may also include other types of sensors such as light sensors, infrared sensors, touch sensors, NFC components, and other sensors. The electronic device 1550 may further include a user interface 1591 configured to present information to the user and/or receive inputs from the user. As illustrated in FIG. 15, the user interface 1591 may include a display screen 1593 and I/O components 1592 (e.g., capacitive or resistive touch sensitive input panels, keys, buttons, lights, LEDs, cursor control devices, haptic devices, and others). In embodiments, the display screen 1593 is a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 1591 may further include an audio module 1594 including hardware components such as one or more speakers 1571 for outputting audio data and one or more microphones 1570 for detecting or receiving audio.

According to embodiments, the components of the user interface 1591 may be embodied in hardware modules that may connect to the electronic device 1550. For example, the display screen 1593 may be a part of a display screen module that connects to the electronic device 1550. Similarly, the hardware modules may include one or more of the set of sensors 1596, as well as hardware that contributes to operation of the processor 1580, to capacity or operation of the memory 1581, or to functionality of the communication module 1595 and/or the external ports 1590. The hardware modules may connect to the electronic device 1550 via a set of connection components 1579 that may be part of a support housing of the electronic device 1550.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 1580 (e.g., working in connection with the operating system 1582) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Thus, it should be clear from the preceding disclosure that the systems and methods offer improved electronic device operation. In particular, the embodiments enable users to effectively and efficiently control device operation through manual adjustment and manipulation of physical hardware modules. Accordingly, the embodiments advantageously enable improved device capabilities for users of the electronic devices.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. An electronic device comprising:
a support housing;
a hardware module configured to connect to the support housing (i) via one or more of a set of connector components, and (ii) from a plurality of movement directions;
a memory storing a set of computer-executable instructions; and
a processor interfacing with the memory, and configured to execute the set of computer-executable instructions to cause the processor to:
detect the hardware module connect to the support housing via the one or more connector components of the set of connector components,
determine a movement direction, from the plurality of movement directions, from which the hardware module connects to the support housing,
in response to detecting the hardware module connect to the support housing:
determine an orientation of the hardware module based on how the hardware module is connected to the support housing,
identify, based at least in part on the movement direction and the orientation of the hardware module, a function associated with the hardware module connected to the support housing, and
activate the function,
detect the hardware module disconnect from the support housing via the one or more connector components, and
in response to detecting the hardware module disconnect from the support housing, deactivate the function.

2. The electronic device of claim 1, wherein to identify the function associated with the hardware module, the processor is configured to:
identify a built-in function of the hardware module,
and wherein to activate the function, the processor is configured to:
activate the built-in function of the hardware module.

3. The electronic device of claim 2, wherein the memory further stores a set of applications,
and wherein the processor is configured to execute the set of computer-executable instructions to further cause the processor to:
identify an application of the set of applications that corresponds to the built-in function of the hardware module, and
initiate the application of the electronic device.

4. The electronic device of claim 1, wherein to identify the function associated with the hardware module, the processor is configured to:
identify a built-in function of the electronic device,
and wherein to activate the function, the processor is configured to:
activate the built-in function of the electronic device.

5. The electronic device of claim 4, wherein the built-in function of the electronic device is an application,
and wherein to activate the built-in function of the electronic device, the processor is configured to:
determine an application input based on the hardware module connected to the support housing, and
initiate the application with the application input incorporated therein.

6. The electronic device of claim 1, wherein the hardware module comprises a first contact and a second contact,
wherein to determine the orientation of the hardware module, the processor is configured to:
determine the orientation of the hardware module based on (i) the first contact connecting to a first connector component of the one or more connector components and (ii) the second contact connecting to a second connector component of the one or more connector components.

7. The electronic device of claim 1, wherein the processor is configured to execute the set of computer-executable instructions to further cause the processor to:
detect an additional hardware module connect to the support housing, and wherein to identify the function associated with the hardware module, the processor is configured to:
determine a connection combination corresponding to the hardware module and the additional hardware module connected to the support housing, and
identify the function based on the connection combination.

8. The electronic device of claim 1, wherein the hardware module comprises a motion sensor configured to detect movement data,
and wherein the processor determines the movement direction from which the hardware module connects to the support housing from the movement data detected by the motion sensor.

9. The electronic device of claim 1, wherein the processor is configured to execute the set of computer-executable instructions to further cause the processor to:
detect the hardware module reconnect to the support housing via one or more additional connector components of the set of connector components, and in response to detecting the module reconnect to the support housing:
- identify an additional function associated with the hardware module, and
- activate the additional function.

10. A computer-implemented method of managing operation of an electronic device comprising a support housing and a hardware module configured to connect to the support housing via one or more of a set of connector components, the method comprising:
- detecting, by a processor, the hardware module connect to the support housing via the one or more connector components of the set of connector components, the hardware module configured to connect to the support housing from a plurality of movement directions,
- determining a movement direction, from the plurality of movement directions, from which the hardware module connects to the support housing,
- in response to detecting the hardware module connect to the support housing:
  - determining an orientation of the hardware module based on how the hardware module is connected to the support housing,
  - identifying, based at least in part on the movement direction and the orientation of the module, a function associated with the hardware module connected to the support housing, and
  - activating the function,
- detecting the hardware module disconnect from the support housing via the one or more connector components, and
- in response to detecting the hardware module disconnect from the support housing, deactivating the function.

11. The computer-implemented method of claim 10, wherein identifying the function associated with the hardware module comprises:
- identifying a built-in function of the hardware module; and wherein activating the function comprises:
- activating the built-in function of the module.

12. The computer-implemented method of claim 11, further comprising:
- identifying an application installed on the electronic device that corresponds to the built-in function of the module; and
- initiating the application.

13. The computer-implemented method of claim 10, wherein identifying the function associated with the hardware module comprises:
- identifying a built-in function of the electronic device; and wherein activating the function comprises:
- activating the built-in function of the electronic device.

14. An electronic device comprising:
- a support housing;
- a set of hardware modules configured to connect to the support housing;
- a memory storing a set of computer-executable instructions; and
- a processor interfacing with the memory, and configured to execute the set of computer-executable instructions to cause the processor to:
  - detect a first hardware module of the set of hardware modules connect to the support housing,
  - after detecting the first hardware module connect to the support housing, detect a second hardware module of the set of hardware modules connect to the support housing, wherein the second hardware module connecting to the support housing after the first hardware module connects to the support housing is indicative of a hardware module connection sequence,
  - determine that the hardware module connection sequence matches a predetermined sequence,
  - identify an application associated with the predetermined sequence and with at least one of the first hardware module and the second hardware module, and
  - initiate the application.

15. The electronic device of claim 14, wherein to initiate the application, the processor is configured to:
- determine an application input based on the module connection sequence, and
- initiate the application with the application input incorporated therein.

16. The electronic device of claim 14, wherein to initiate the application, the processor is configured to:
- determine an application function based on the hardware module connection sequence, and
- cause the application to initiate the application function.

* * * * *

UNITED STATES PATENT AND TRADEMARK OFFICE
CERTIFICATE OF CORRECTION

PATENT NO. : 9,785,487 B1
APPLICATION NO. : 14/709982
DATED : October 10, 2017
INVENTOR(S) : Eric Liu et al.

Page 1 of 1

It is certified that error appears in the above-identified patent and that said Letters Patent is hereby corrected as shown below:

In the Claims

At Column 21, Line 1, "module" should be -- hardware module --.

At Column 21, Line 25, "module," should be -- hardware module, --.

At Column 21, Line 39, "module." should be -- hardware module. --.

At Column 21, Line 44, "module;" should be -- hardware module; --.

At Column 22, Line 36, "module" should be -- hardware module --.

Signed and Sealed this
Twenty-seventh Day of February, 2018

Andrei Iancu
*Director of the United States Patent and Trademark Office*